No. 792,889.

Patented June 20, 1905.

UNITED STATES PATENT OFFICE.

WALTHER FELD, OF HÖNNINGEN-ON-THE-RHINE, GERMANY.

PROCESS OF MAKING HYDROCYANIC ACID FROM IRON-CYANOGEN COMPOUNDS.

SPECIFICATION forming part of Letters Patent No. 792,889, dated June 20, 1905.

Application filed May 10, 1902. Serial No. 106,703.

*To all whom it may concern:*

Be it known that I, WALTHER FELD, manufacturer, a subject of the King of Prussia, Emperor of Germany, residing at Hönningen-on-the-Rhine, Rheinprovinz, in the Kingdom of Prussia, German Empire, have invented certain new and useful Improvements in and Relating to the Manufacture of Hydrocyanic Acid from Iron-Cyanogen Compounds; and I do declare the following to be a full, clear, and exact description of the invention, such as will enable others skilled in the art to which it appertains to make and use the same.

The present invention relates to the manufacture of hydrocyanic acid from iron-cyanid compounds.

It is known that mercuric oxid decomposes soluble and insoluble iron-cyanid compounds and that mercuric sulfate decomposes soluble ferrocyanid compounds with formation of mercuric cyanid. Mercuric oxid decomposes, however, soluble or insoluble iron-cyanid compounds but very slowly and separates in the presence of ferrocyanid compounds metallic mercury. Moreover, in using mercuric oxid part of the hydrocyanic acid or cyanogen will be destroyed by oxidation in consequence of the oxidizing property of mercuric oxid. Mercuric sulfate ($HgSO_4$) can only be used for decomposing soluble ferrocyanid compounds in a neutral solution. It has also the disadvantage to separate metallic mercury when acting on ferrocyanid compounds. Mercuric sulfate is unapt to decompose iron-cyanid compounds in acid or alkaline solutions. In acid solutions it has no action at all on iron cyanids, whereas in alkaline solution it is decomposed, mercuric oxid being precipitated, causing the disadvantages above stated.

The present process obviates the aforesaid disadvantages and permits of practically recovering the whole of the cyanogen from ferrocyanid compounds without loss of mercury or separation of metallic mercury.

I have now found that mercuric chlorid ($HgCl_2$) is by far more suitable than the mercury compounds above named for manufacturing hydrocyanic acid from iron-cyanid compounds. First, the decomposition of the iron-cyanid compounds is more complete by mercuric chlorid; secondly, metallic mercury will not be separated, because in decomposing ferricyanid compounds no reduction enters, whereas in decomposing ferrocyanid compounds the mercuric chlorid ($HgCl_2$) used is only reduced to mercurous chlorid, ($Hg_2Cl_2$,) but not to metallic mercury, and, thirdly, the mercuric chlorid can be used in neutral, acid, or alkaline solution. This process is adapted for application to all materials containing iron-cyanid compounds—for example, gas-purifying materials, Prussian blue, ferrocyanid and ferricyanid compounds, &c. It is unimportant whether the compounds are soluble or insoluble.

For carrying out my invention the materials to be decomposed are treated with the required quantity of mercuric chlorid, preferably in solution. The solution is then heated, the reaction being effected most rapidly at boiling temperature.

The reactions may be expressed as follows:

(1) With ferrocyanid of potassium:

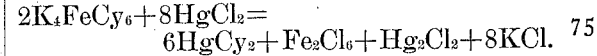
$$2K_4FeCy_6 + 8HgCl_2 = 6HgCy_2 + Fe_2Cl_6 + Hg_2Cl_2 + 8KCl.$$

(2) With ferricyanid of potassium:

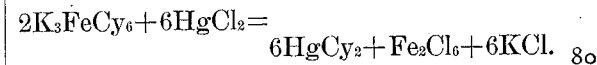
$$2K_3FeCy_6 + 6HgCl_2 = 6HgCy_2 + Fe_2Cl_6 + 6KCl.$$

(3) With Prussian blue:

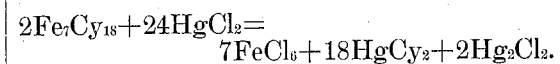
$$2Fe_7Cy_{18} + 24HgCl_2 = 7FeCl_6 + 18HgCy_2 + 2Hg_2Cl_2.$$

If the materials used contain free acid, then the mercuric cyanid formed during the reaction is at once decomposed, yielding hydrocyanic acid.

If there be insoluble iron-cyanid compounds (such as insoluble Prussian blue) which are not readily decomposed by mercuric chlorid, it is preferable to render them soluble by treating with caustic alkalies or earth alkalies or with such compounds as are susceptible of yielding caustic alkalies or earth alkalies, yielding an alkaline solution of alkali ferrocyanid, which is treated in the following way: If a material of alkaline reaction be used, it should be rendered neutral or acid, so that it is more suitable for treatment by this process. It is more advantageous when employing alkaline materials to neutralize and to carry out the treatment with mercuric chlorid by and in the presence of an excess of such salts, the basic hydrates, oxids, or carbonates of which do not precipitate metallic mercury or mercuric or mercurous oxid out of mercuric-chlorid solution, but which precipitate iron hydro-oxid from the solution of iron salts. Suitable salts of this kind are the chlorids or other salts of magnesium, zinc, aluminium, and manganese, alkalies separating out of the solutions of these salts basic hydrates—for example, $Mg(OH)_2$, $Zn(OH)_2$, $Al_2(OH)_6$, $Mn(OH)_2$—which do not affect the mercuric-chlorid solution, especially if there is an excess of the said salts in the mercuric-chlorid solution. These salts are mixed with the materials to be treated, or they may be added as a solution, together with the mercuric chlorid. The quantities of the salts employed must be such as to cause the complete neutralization of the alkalies or earth alkalies and to keep the mercuric chlorid in solution. It is therefore preferable to add so much of the said salts that a part thereof will remain undecomposed, an excess of the salts not being objectionable. By using magnesium salts (for example, magnesium chlorid) magnesium hydroxid is first formed. The reaction may be represented by the following formula:

(4) $K_4FeCy_6 + 2KOH + MgCl_2 =$
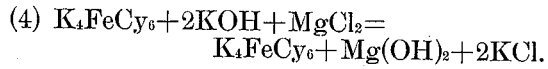

The decomposition of the iron-cyanid compounds by the mercuric chlorid then takes place according to the following equations:

(5) Ferrocyanid of potassium being decomposed:

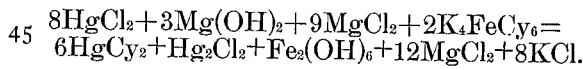

(6) Ferricyanid of potassium being decomposed:

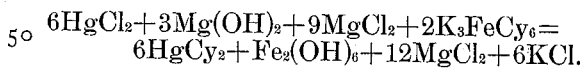

The reaction is again carried out under the application of heat, preferably by boiling, mercuric cyanid being formed and ferric hydroxid being precipitated. As soon as the reaction is sufficiently advanced acid is added, so as to cause the whole mercuric cyanid to be decomposed by liberating hydrocyanic acid. This decomposition may be effected by heating. If the acid be added before the reaction is completed—i. e., before all the ferrous protoxid salt has been oxidized to ferric salt at the expense of the mercuric chlorid, forming mercurous chlorid—the formation of Prussian blue may take place, which latter would then precipitate from the solution, and thus becoming mixed with the sediment would be but slowly decomposed by excess of the mercuric chlorid. Before adding acid the precipitate of ferric hydroxid, &c., may be separated from the solution by filtration or any other suitable method after adding in case of need alkaline matters to complete the precipitation of ferric oxid. The acid solution which remains after driving off the hydrocyanic acid from the mercuric cyanid may contain (when hydrochlorid acid, for example, has been used) besides mercuric chlorid also ferrichlorid, magnesium chlorid, and potassium chlorid, and in the case of ferrocyanid being decomposed mercurous chlorid, and if there were sulfur compounds in the original materials there may be found mercuric sulfid. If the precipitate of ferric hydroxid has been separated from the mercuric-cyanid solution before distilling with an acid, no mercurous chlorid or mercury sulfid will be formed in the solution; but this precipitate may contain such compounds. In order to regenerate the mercuric chlorid required for my process, the liquid or the precipitate containing mercurous chlorid or sulfid is treated with an oxidizing agent—for example, bleaching-powder. Thereby the mercurous chlorid and mercuric sulfid are converted into mercuric chlorid, so that the mercuric chlorid (and also magnesium chlorid, if such be present) used in the decomposition of the iron-cyanogen compounds may be used again in carrying out the process. It may be advantageous to separate the iron compounds from the liquid remaining after the treatment with the oxidizing agent, and this may be effected by oxids, hydroxids, or carbonates of alkalies, earth alkalies, magnesia, or the like.

In order to avoid even in treating materials containing ferrocyanid compounds the formation of mercurous protochlorid and the subsequent oxidation of the said substance, I may oxidize the ferrocyanid compounds by using any suitable oxidizing means before the addition of the mercuric chlorid, in which case the decomposition of the ferricyanid formed will enter according to the formula (2 or 6) above shown. Instead of mercuric chlorid I may also use mixtures of other mercuric salts with chlorids—for example, with sodium chlorid, magnesium chlorid, and the like. In such mixtures a reaction enters between the chlorid and the mercuric salts with formation of mercuric. The following gives a practical example of the process if ferricyanids be decomposed:

Example: Sixty-five parts of alkaline potassium ferricyanid being dissolved, say, in six hundred parts of water, to this solution so much magnesium chlorid is added as is necessary to neutralize the free alkali yielding of alkali chlorid and magnesium hydrate. A solution of about eleven per cent. $K_3FeCy_6$ will result, which contains a precipitate of magnesia hydrate. The solution, however, may be more or less concentrated than eleven per cent., the result being the same. To this solution is added the mercuric-chlorid magnesium-chlorid solution. Thus one hundred and sixty parts of mercuric chlorid and so much magnesium chlorid are used that the mercuric chlorid is easily kept in solution. One hundred and sixty parts of mercuric chlorid ($HgCl_2$) together with two hundred and fifty parts of magnesium chlorid ($MgCl_2$) dissolved in eight hundred parts of water has been found a very suitable strength, although weaker or stronger solution may be used if only the solution contains at least one hundred and sixty parts of mercuric chlorid, any excess of this being harmless.

Both solutions—the ferricyanid solution and the mercury solution—preferably are heated to boiling-point before being mixed. As soon as the solutions are mixed mercuric cyanid will be formed and ferric hydroxid will be precipitated by the action of the magnesia hyrate present upon the ferric chlorid. About five or ten minutes boiling will render complete the decomposition of the iron-cyanid compound. If the magnesia hydrate present be not sufficient to precipitate the whole of the iron dissolved, some oxid, hydrate, or carbonate of alkali, earth alkali, or magnesia may be added. The solution then is separated from the ferric-hydroxid precipitate and is distilled with about forty-five parts of hydrochloric acid (HCl) or about sixty parts of sulfuric acid, ($H_2SO_4$,) the strength of the acid used being unimportant, strong acids being preferable, an excess of the acid being of no harm. After about fifteen to thirty minutes boiling all hydrocyanic acid will be liberated. After having neutralized the regenerated solution of mercuric chlorid by an alkaline material it is used again for a new decomposition. The mercuric-chlorid magnesium-chlorid solution must be neutralized before being used for decomposing fresh iron-cyanogen solutions, free acid liberating at once hydrocyanic acid from the latter, which must be avoided if the decomposition of the iron cyanid is carried out in an open vessel.

If the iron hydroxid has not been filtered off before the distillation, it may be precipitated and separated from the regenerated solution of mercuric-magnesium chlorid by alkaline matters and filtered off before using the solution again.

What I claim, and desire to secure by Letters Patent of the United States, is—

1. The process of making hydrocyanic acid by aid of mercuric chlorid from matters containing iron cyanids, which consists in treating them with mercuric chlorid and decomposing the mercuric cyanid thus formed by distillation with acid.

2. The process of making hydrocyanic acid by aid of mercuric chlorid from matters containing iron cyanids, which consists in neutralizing matters of alkaline reaction, treating the neutralized mass with mercuric chlorid and decomposing the cyanid of mercury thus formed by distillation with acid.

3. The process of making hydrocyanic acid by aid of mercuric chlorid from matters containing iron cyanids, which consists in neutralizing matters of alkaline reaction by treating them with a salt of a metal, the hydrates, oxids and carbonates of which do not precipitate mercury compounds from a solution of mercuric chlorid, then treating with mercuric chlorid and decomposing the cyanid of mercury thus formed by distillation with acid.

4. The process of making hydrocyanic acid by aid of mercuric chlorid from matters containing iron cyanids, which consists in neutralizing matters of alkaline reaction by treating them with salts of a metal, the hydrates, oxids and carbonates of which do not precipitate mercury compounds from mercury-chlorid solutions, then treating with mercuric chlorid, percipitating ferric oxid by alkaline substances, filtering and decomposing the mercuric-cyanid solution thus formed with acid.

5. The process of making hydrocyanic acid by aid of mercuric chlorid from matters containing iron cyanids, which consists in neutralizing matters of alkaline reaction by treating them with salts of a metal, the hydrates, oxids and carbonates of which do not precipitate mercury compounds from mercuric-chlorid solutions, then treating with mercuric chlorid, precipitating ferric oxid by alkaline substances, filtering and decomposing the mercuric-cyanid solution thus formed with acid and regenerating the mercury compounds in the precipitate by treating with oxidizing means.

6. The process of making hydrocyanic acid by aid of mercuric chlorid from matters containing iron cyanids, which consists in neutralizing matters of alkaline reaction with salts of a metal, the hydrates, oxids and carbonates of which do not precipitate mercury compounds from mercuric-chlorid solutions, treating with mercuric chlorid, and decomposing the mercuric-cyanid solution thus formed with acid, regenerating mercuric chlorid from the precipitate by treating the solution with oxidizing means and precipitating the iron from this solution by alkaline substances.

7. The process of making hydrocyanic acid by aid of mercuric chlorid from matters containing iron cyanids, which consists in the preliminary conversion of ferrous cyanid compounds into ferric-cyanid compounds by oxidizing means, neutralizing matters of alkaline reaction, treating with mercuric chlorid, precipitating the present ferric oxid by alkaline substances, filtering and decomposing the mercuric-cyanid solution thus formed, with acid.

In witness whereof I have hereunto signed my name, this 25th day of April, 1902, in the presence of two subscribing witnesses.

WALTHER FELD.

Witnesses:
   CARL SCHMITT,
   GOH. SCHOLZ.